INVENTORS.
JACOB DOUGLAS GAY, JR.
AND FREDERIC W. JOSWIG,
BY [signature],
[signature]
ATTORNEYS.

PAPERBOARD HOGSHEAD

Original Filed June 27, 1957

INVENTORS.
JACOB DOUGLAS GAY, JR.
AND FREDERIC W. JOSWIG,
BY
Yungblut, Melville, Strasser & Foster
ATTORNEYS.

April 26, 1966 J. D. GAY, JR., ETAL 3,248,035

PAPERBOARD HOGSHEAD

Original Filed June 27, 1957 5 Sheets-Sheet 3

INVENTORS.
JACOB DOUGLAS GAY, JR.
AND FREDERIC W. JOSWIG,
BY

Yungblut, Melville, Strasser & Foster

ATTORNEYS.

PAPERBOARD HOGSHEAD

Original Filed June 27, 1957

INVENTORS.
JACOB DOUGLAS GAY, JR.
AND FREDERIC W. JOSWIG,
BY
Yungblut, Melville, Strasser & Foster
ATTORNEYS.

PAPERBOARD HOGSHEAD

Original Filed June 27, 1957 5 Sheets-Sheet 5

INVENTORS.
JACOB DOUGLAS GAY, JR.
AND FREDERIC W. JOSWIG.
BY
Younghlut, Melville, Strasser & Foster
ATTORNEYS.

1

3,248,035
PAPERBOARD HOGSHEAD

Jacob Douglas Gay, Jr., and Frederic W. Joswig, Paris, Ky., assignors to Gay-Bell Corporation, Paris, Ky., a corporation of Kentucky Original application June 27, 1957, Ser. No. 668,393, now Patent No. 3,157,340, dated Nov. 17, 1964. Divided and this application May 25, 1964, Ser. No. 375,410
2 Claims. (Cl. 229—5.7)

Figures 1, 2, 3, 4A:
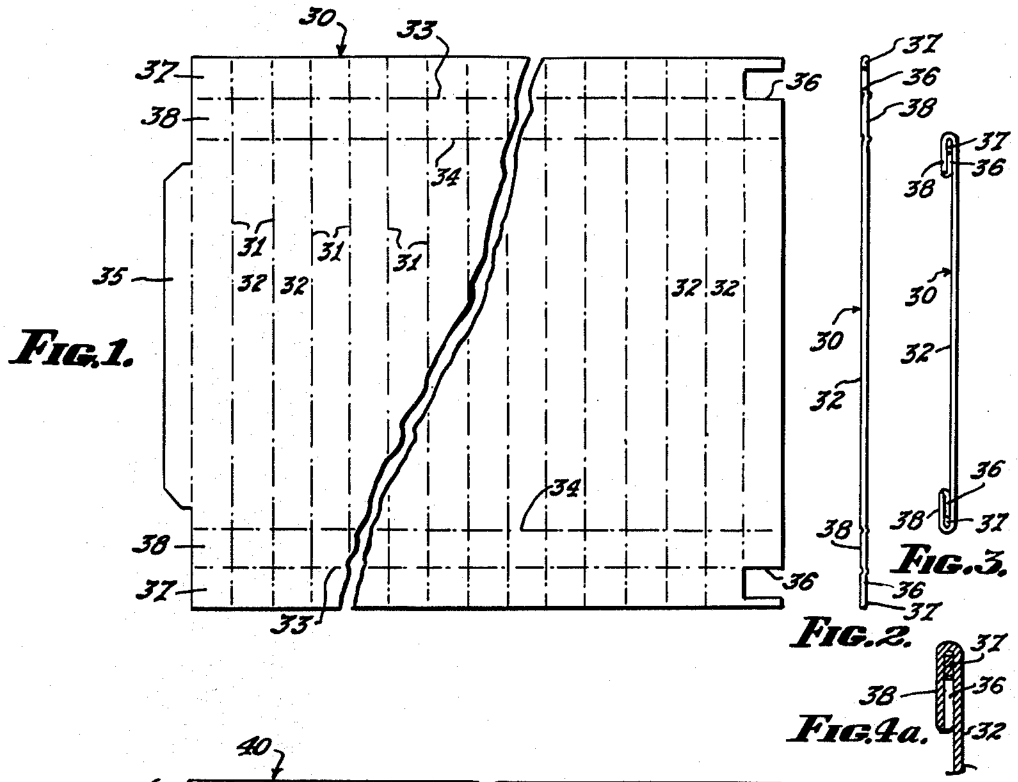

This application is a division of application Serial No. 668,393, filed June 27, 1957, now United States Patent 3,157,340.

This invention resides in a novel hogshead arrangement whereby the hogshead may be formed of paperboard or other formable material.

Hogheads of the general type shown in the patent to H. G. Bell et al. dated June 12, 1951, Patent No. 2,556,789 entitled, Barrel and Barrel Head Therefor, are now well known in the art. A satisfactory method for making such a hogshead is shown in another patent to H. G. Bell et al. dated June 5, 1951, Patent No. 2,555,530 entitled, Method of Making Knock-Down Shipping Containers. A similar hogshead is shown in the patent to H. G. Bell dated May 22, 1951, Patent No. 2,554,357 entitled, Knock-Down Hogshead for Tobacco. Yet another hogshead of the general type to which the instant invention applies is shown in the co-pending application to H. G. Bell filed May 24, 1955, under Serial No. 510,610 entitled, Improved Barrel and Barrel Head Therefor.

Two other pending applications should also be mentioned. Pending application Serial No. 544,258 filed November 1, 1955 by H. G. Bell et al. entitled, Apparatus and Method for the Continuous Production of Hogsheads and the Like, and pending application Serial No. 588,726 filed by H. G. Bell et al. on June 1, 1956, and entitled, Improved Apparatus and System for the Continuous Production of Hogsheads and the Like, both disclose modern, wooden hogsheads and improved apparatus and means for their manufacture.

The instant invention is directed to hogsheads of the same general type shown in the aforementioned patents and pending applications but differs in that certain novel adjustments have been made in order to form the hogsheads from paperboard rather than wood. This invention, of course, is directed to more than just the concept of making a hogshead out of paperboard. In order to accomplish this certain structures had to be devised and it is to these improvements that this application is directed.

In a co-pending application filed of even date herewith and entitled Metal Hogshead there is disclosed a novel arrangement by which hogsheads of the same general type shown in the aforementioned patents and pending applications may be made of metal. In such co-pending application the basic concept is not just to use metal instead of wood but rather such co-pending application is directed to the novel features which permit such a change. This co-pending application is mentioned herein since there is a relationship between the two and it will be understood that those features common to both the metal and the paperboard hogshead will be claimed in one of these two co-pending applications.

Also, although the instant invention is directed chiefly towards hogsheads made of paperboard, metal or other formable material might also be used even in the application of the teachings herein set forth. In most cases, however, metal presents certain problems which are apparently now best solved by the teachings of the said co-pending application.

An important object of this invention is to provide a

2 hogshead which is switchable with wooden hogshead of the type aforementioned and which may even be disposable.

Another important object of the invention is to provide a hogshead which may be termed a "one-way" hogshead especially adapted for shipping tobacco between continents.

Another object of this invention is to provide a hogshead which may be wrapped around a cask of tobacco after the hogshead in which the tobacco was first packed has been removed.

Another important object of this invention is to provide a hogshead which although made of paperboard may still be roughly handled without injury either to the hogshead or to the tobacco therewithin.

It is to be understood that although the invention is described in terms of a hogshead for containing tobacco the invention is not limited just to containers for tobacco; obviously other materials may be packaged in the container of this invention.

It is also an important object of our invention to provide a container rectangular in cross-section as distinguished from the ordinary barrel type now so much in use.

The foregoing objects and others will become apparent to those skilled in the art from the description of the invention to follow and from reference to the accompanying drawings, in which drawings like numerals are employed to designate like parts and in which:

FIGURE 1 shows a paperboard blank which has been cut and scored prior to its manipulation into the basic hogshead body, FIGURE 2 is an end view taken from the right side of the blank of FIGURE 1, FIGURE 3 is an end view of the blank after the top and bottom edges have been folded as will be described.

Figure 4:
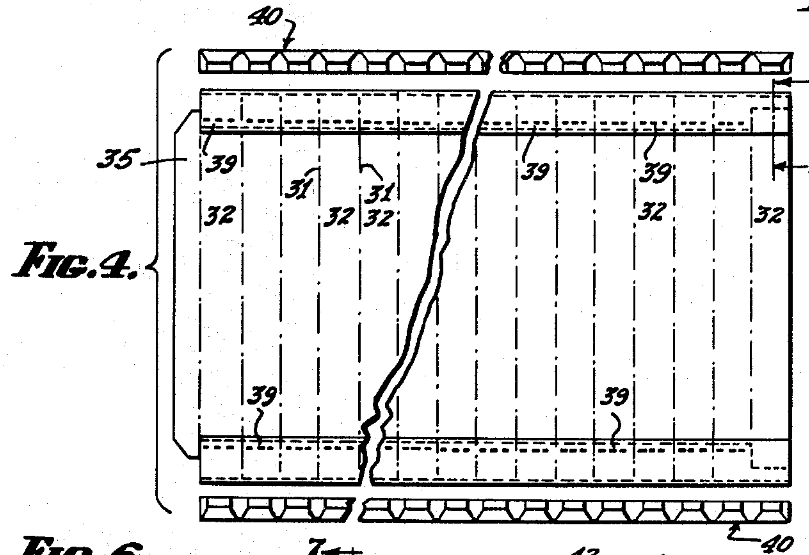
Figure 5:
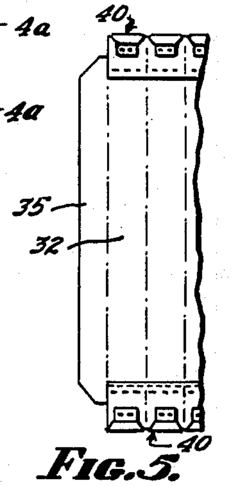
Figure 6:
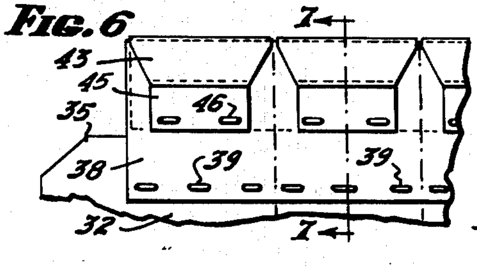

FIGURE 4 is a view of the blank after the top and bottom edges have been folded and stapled, the view being exploded to show the chimes or hoop-and-liners as they are about to be put in position, FIGURE 4*a* is a section taken on the line 4*a*—4*a* of FIGURE 4, FIGURE 5 is a fragmentary view of the blank with the edges folded and stitched and with the hoop-and-liner stitched in position on such edges, FIGURE 6 is an enlarged fragmentary view of the paperboard hogshead blank with the edges stitched and metal hoop-and-liner fastened in place.

Figure 7:
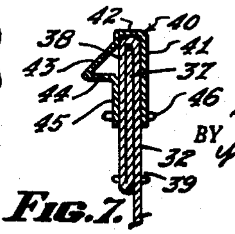
Figure 8:
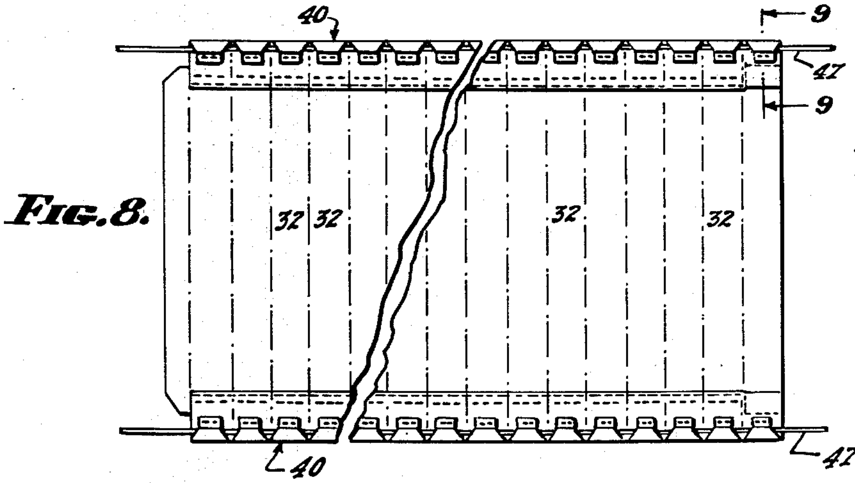
Figure 9:
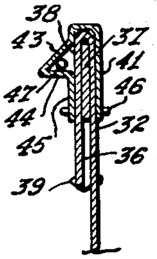
Figure 10:
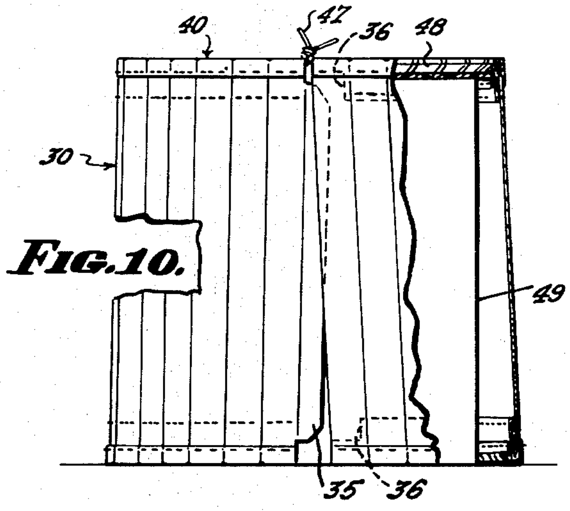
Figures 11, 13:
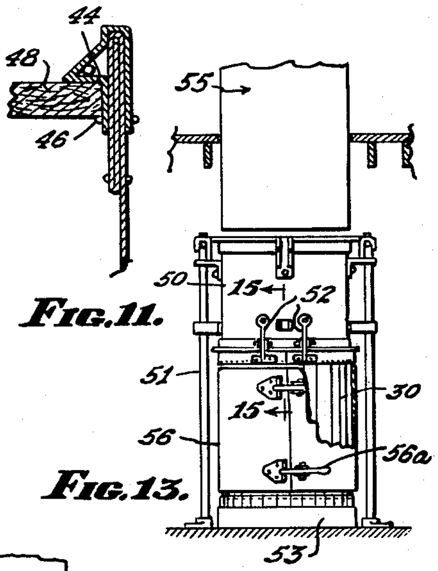
Figure 12:
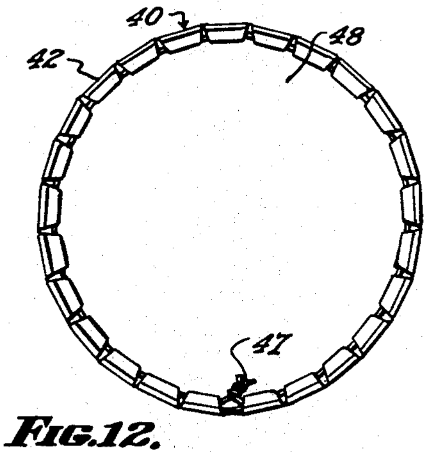
Figure 14:
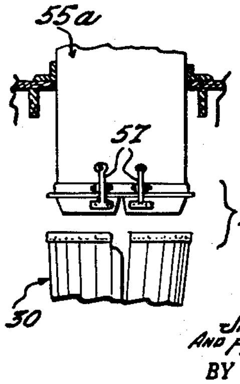
Figures 15, 16, 17, 18, 19:
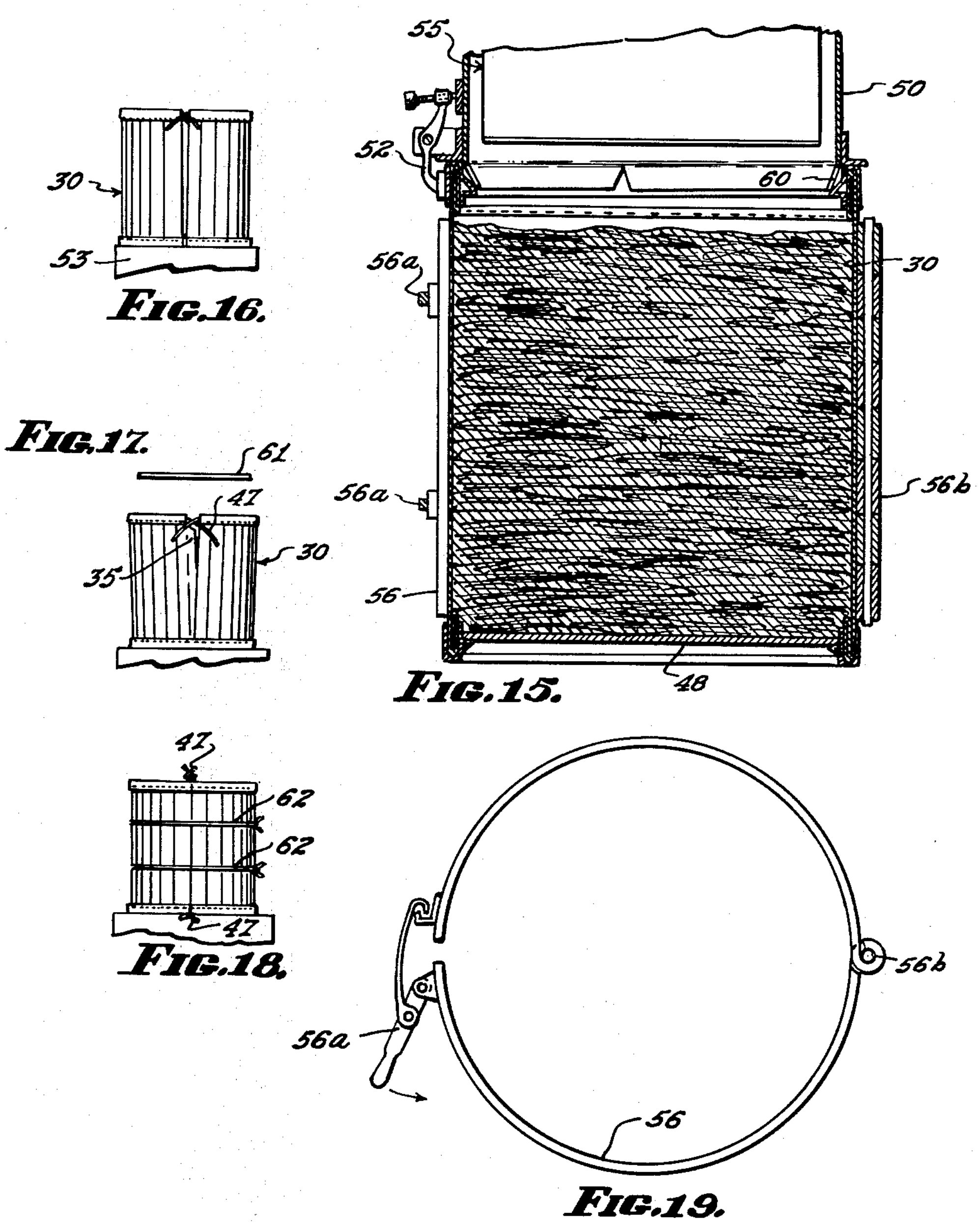
Figures 20, 21:
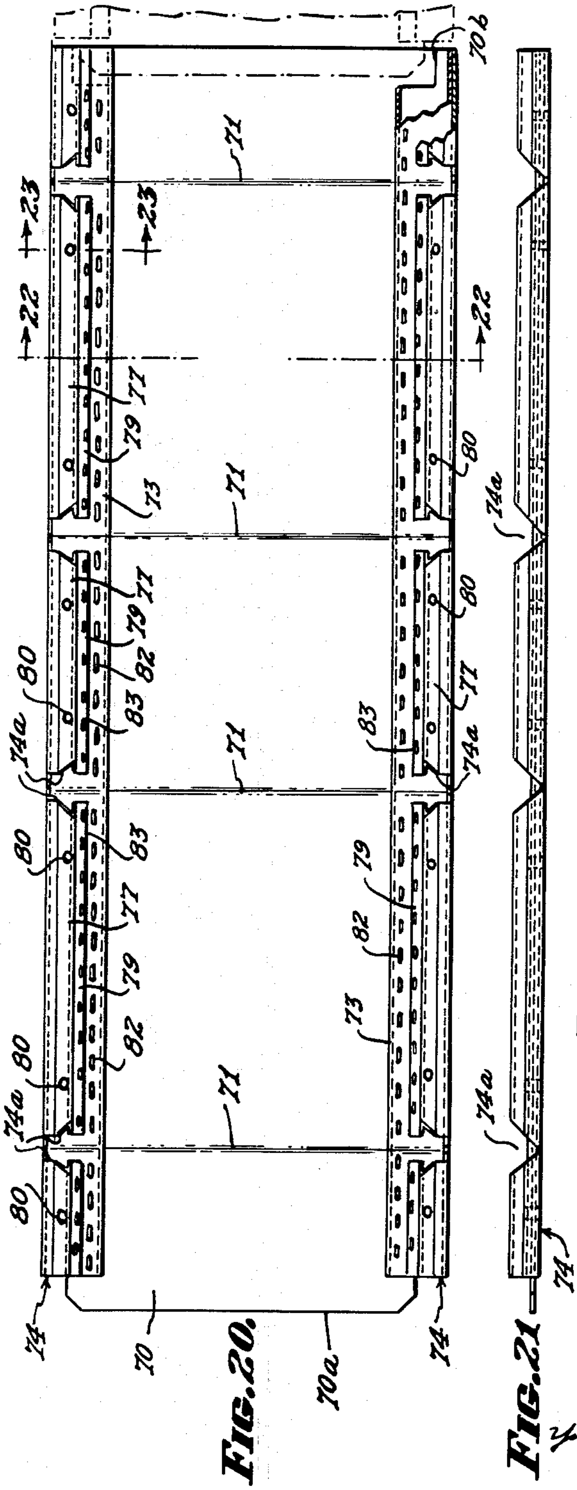
Figures 23, 24:
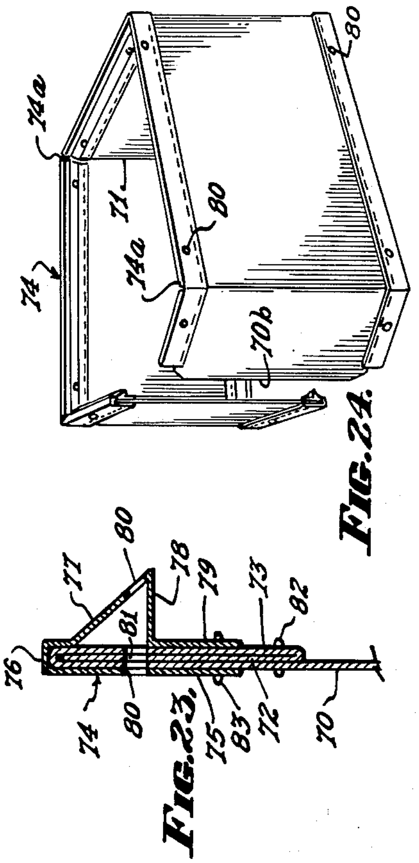
Figure 22:
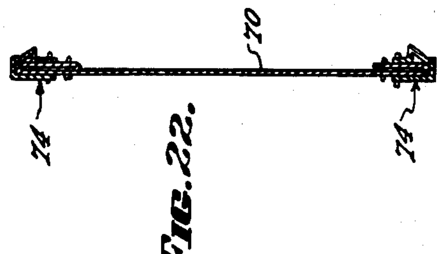
Figure 25:
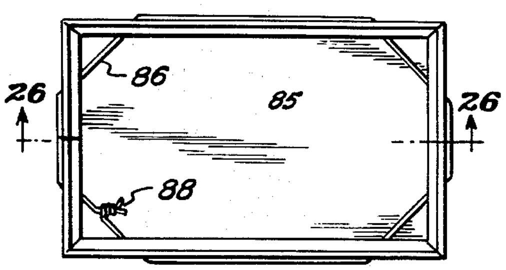
Figure 27:
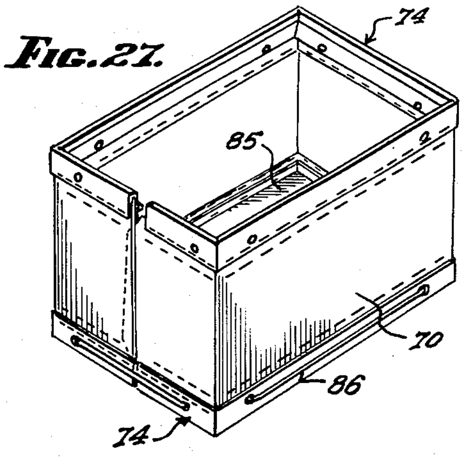
Figure 26:
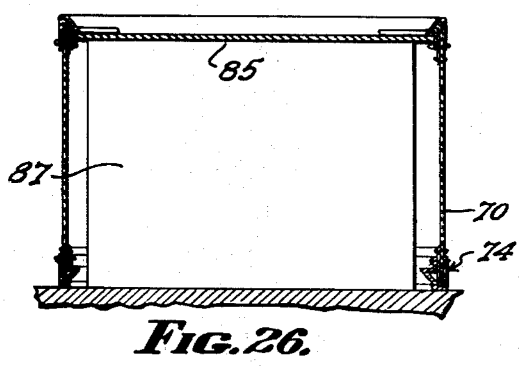

FIGURE 7 is a section taken on the line 7—7 of FIGURE 6,

FIGURE 8 is a view showing the hogshead blank with the hoops-and-liners in place and the wires also put in position, FIGURE 9 is a section on the line 9—9 of FIGURE 8, FIGURE 10 is a perspective view with parts broken away and parts in section of a hogshead of this invention as it is gathered around a top or bottom, FIGURE 11 is a fragmentary section of the upper right hand corner of the arrangement shown in FIGURE 10, FIGURE 12 is a plan view taken from the top of FIGURE 10, FIGURE 13 is a fragmentary front elevational view of one arrangement for packing the paperboard hogshead of this invention with tobacco, FIGURE 14 is a fragmentary front elevational view of another arrangement for prizing tobacco in a paperboard hogshead, FIGURE 15 is an enlarged fragmentary vertical sectional view taken along the line 15—15 of FIGURE 13, FIGURE 16 is a front elevational view of a hogshead packed with tobacco and prior to insertion of top head, FIGURE 17 is an exploded front elevational view showing the top head about to be placed in the paperboard hogshead of FIGURE 16, FIGURE 18 is a side elevation showing a paperboard hogshead packed with tobacco, FIGURE 19 is a plan view of an exemplary embodiment of a corset which may be used during the tobacco packing steps, FIGURE 20 is a front elevational view of the knock-down form of a tobacco container shaped like a box, FIGURE 21 is a side elevational view of the knock-down box of FIGURE 20, FIGURE 22 is a section taken on the line 22—22 of FIGURE 20, FIGURE 23 is an enlarged detail section taken on the line 23—23 of FIGURE 20, FIGURE 24 is a perspective view of a box as partly erected, FIGURE 25 is a plan view of a box showing the bottom in place, FIGURE 26 is a section taken on the line 26—26 of FIGURE 25, FIGURE 27 is a perspective view of a box with the bottom in place.

Figure 28:
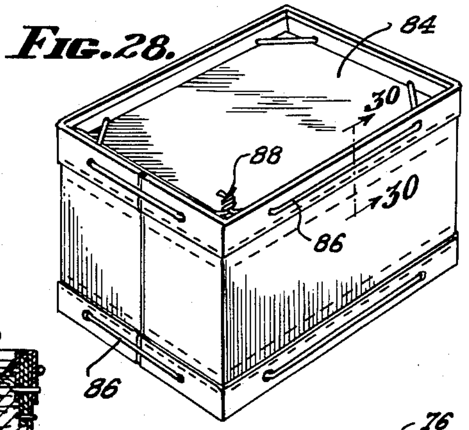
Figure 29:
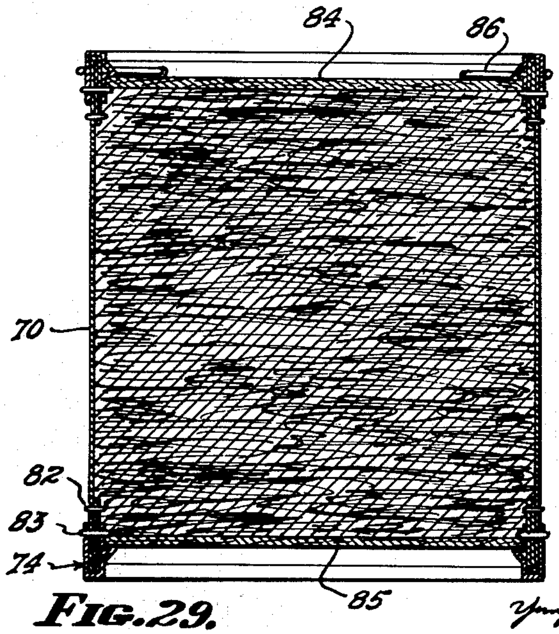
Figure 30:
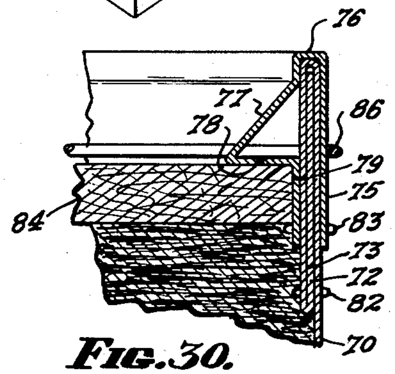

FIGURE 28 is a perspective view similar to FIGURE 27 and also showing the top of the box in place, FIGURE 29 is a vertical section through a completed box, and FIGURE 30 is an enlarged detail section taken on the line 30—30 of FIGURE 28.

Referring now especially to FIGURES 1 through 3 the paperboard blank from which one form of the hogshead of this invention is formed will be described. Again, although the invention is described in terms of paperboard it is possible that other materials may be used.

FIGURE 1 shows a paperboard blank generally indicated at 30 and having a plurality of score lines 31 which define what corresponds to staves 32 of a wooden hogshead such as shown and described in the aforementioned patents and pending applications. The blank 30 is also scored along its top and bottom edges as indicated by the score lines 33 and 34. In addition the blank is cut so as to form the end flap 35 and the pair of notches 36. The score lines 33 and 34 define fold strips 37 and 38.

In constructing a hogshead from the blank scored and cut as just described in connection with FIGURES 1 and 2, the blank is first folded along the score lines 33 so as to bring the upper and lower fold strips 37 against the fold strips 38. It will be understood that the top and bottom portions of the blank 30 are identical and that, therefore, like reference numerals have been employed to designate the corresponding score lines and fold strips. The blank 30 is then folded along the score lines 34 so as to bring the fold strip 37, in which the notch 36 is located, into flush contact with the body of the blank 30. This fold strip 37 will, therefore, lie against the ends of the staves 32 defined by the score lines 31. Perhaps this relationship of the notch 36 to the fold strips 37 and 38 in folded condition is best seen in FIGURE 4*a*.

Referring now to FIGURES 4 through 9 other stages in the formation of a paperboard hogshead according to the teachings of this invention will be described. After the hogshead has been brought to the condition of FIGURE 3 it is then stitched so as to maintain the fold strips 37 and 38 adjacent the ends of the stave portions 32. This stitching has been shown as being accomplished by staples but it will be understood that other fastening devices may be used. These staples 39 pass through the paperboard layers comprised of the fold strip 38, fold strip 37 and stave 32. It is preferred that there be at least one staple or fastening means for each end of each of the staves 32. In the arrangement shown there are three such staples at each end of these staves.

Although it is possible, as indicated in the said co-pending application entitled, Metal Hogshead, to form a paperboard blank with the hoop-and-liner an integral part thereof as is specifically taught in said co-pending application for hogsheads formed of light gauge metal, it has in the case of paperboard been found more desirable to use a separate chime or hoop-and-liner which latter element is formed of a suitable metal. The hoop-and-liner for the top and bottom of the paperboard hogshead of this invention are identical and will be described with like reference numerals. Such a hoop-and-liner is generally indicated at 40 and is probably best seen in FIGURES 4, 6 and 7.

The chime or hoop-and-liner of the just mentioned figures comprises a band of metal which lies flush against the outside of the staves 32 as indicated at 41. The hoop-and-liner 40 is bent at right angles to the band 41 and notched so as to provide a plurality of segments 42, one such segment lying across each end of a stave 32 and the fold strips adjacent thereto. The band 40 is further formed so as to provide a portion 43 slanting inwardly and downwardly from each of the segments 42. The chime or hoop-and-liner 40 is then return bent to provide a portion 40 directed towards the stave 32 at right angles thereto. The metal is then bent to provide the inner flange 45 which is at right angles to the portion 44 and parallel to the outer band 41. The distance between the bands 41 and 45 is just sufficient nicely to receive the upper or lower end of the paperboard hogshead body as defined by the staves 32 and fold strips 37 and 38.

As indicated in the exploded view of FIGURE 4 these hoops-and-liners 40 are simply placed on the upper and lower edges of the paperboard hogshead so as to bring them to the position indicated in FIGURES 5 and 7. Following this the members 40 are then secured to the hogshead body. Preferably this is accomplished by driving a staple through each of the chime sections 45, fold strips 37 and 38, and stave 32. Two such staples 46 have been indicated for each of the segments 45 and corresponding staves 32.

After the hogshead has been formed in the manner indicated in connection with FIGURES 1 through 7, a pair of wires 47, one for the upper end of the hogshead and one for the lower end, is arranged so that there is such a wire within the area primarily defined by the chime section 43 and 44 and the fold strip 38.

The hogshead of FIGURES 1 through 9 is now ready for use in one of two basic ways. In some instances it may be desirable to use the paperboard hogshead of this invention in the manner described in connection with the metal hogshead of the said co-pending application. When so used the wooden or other type hogshead in which the tobacco may have been prized is first removed, thus leaving a cask of tobacco resting on a hogshead bottom and covered by a hogshead top. The paperboard hogshead of this invention is then wrapped around this cask and manipulated so as to bring the hogshead top and hogshead bottom into engagement with the chime sections 44, where they will be held between such section and the staple 46, after which the wires 47 may be tightened so as to attach the hogshead to such tops and bottoms. The just mentioned relationship between a hogshead top or bottom 48 and the chime section and staple is shown in FIGURE 11 and described in detail in pending application Serial No. 510,610 aforementioned.

Thus, as shown and described in greater detail in the said co-pending application entitled, Metal Hogshead, these paperboard or metal hogsheads may be used to replace the hogshead in which the tobacco was actually prized. Because of the weight of these "switchable" hogsheads and because of economies realized in their manufacture, it is economical to use these hogsheads in shipping tobacco after it is prized even should one treat such hogshead as disposable or non-returnable. This is a unique result in the hogshead field made possible by the teachings of these inventions.

It has been found, however, as also generally indicated in the said co-pending application, that these paperboard and/or metal hogsheads might even be used in the prizing of tobacco and might even be capable of more than one such use. This leads us to the second manner in which the paperboard hogshead of FIGURES 1 through 9 may be utilized and this will be described as follows.

In FIGURE 10 the paperboard hogshead is being made ready to have tobacco prized therein. In order to do this there is a support 49 on which rests a hogshead bottom 48. The paperboard hogshead is gathered around this bottom and the wires 47 tightened so that the bottom 48 is located with respect to the chime portion 44 and staple 46 in the manner shown in FIGURE 11. The hogshead is then removed from the support and turned right side up so as to put the lid member 48 on the bottom. FIGURE 12 shows the bottom head 48 in place.

There are several ways in which the paperboard hogshead of FIGURES 10 through 12 may be prized with tobacco. In FIGURE 13 there is shown a rig comprised of a shell 50 supported on vertical legs 51 and having clamps 52 for engaging the upper part of a hogshead 30. The hogshead 30 rests on a support 53. With the hogshead properly fastened to the charger shell 50 a prizing machine 55 then operates to introduce tobacco within the hogshead 30 (vis. the shell 50) and periodically presses same therewithin. Since the weight of the shell 50 is supported from the legs 51 and since the basic pressures occurring during the prizing of the tobacco are vertical rather than lateral it is possible to pack a paperboard hogshead with as much as 900 or 1000 pounds of tobacco which corresponds favorably with quantities which are prized in wooden hogsheads of similar dimensions.

We have also found it desirable, in connection with the prizing arrangement of FIGURE 13, to employ a corset which may be clamped about the hogshead prior to the introduction of tobacco. This corset is indicated at 56 and is designed to surround the hogshead between the upper and lower hoops-and-liners. Such corset 56 may drawn snugly about the hogshead 30 by means of the clamps *56a* with which it is provided, see also FIGURE 19. In this connection it will be noted that the corset itself has a hinged connection as generally indicated at *56b*.

In order to prize a tobacco hogshead according to the arrangement so far shown a hogshead is placed on the support 53 beneath the shell 50 to which the hogshead 30 is clamped as indicated at 52, the shell itself being supported from the floor on the legs 51. The corset 56 is then placed about the hogshead 30 and clamped in position. The hogshead is then filled wtih tobacco and subjected to a pressing operation by the charging or prizing means 55 whereafter additional tobacco is placed within the hogshead on top of that first pressed and the prizing means again actuated. Usually two or three such prizing operations will serve to pack the necessary tobacco within the hogshead. After a suitable quantity of tobacco has been so placed within the hogshead the shell 50 is released and removed whereafter the corset 56 is also released and removed. The head is then placed within the hogshead (in the same relative position as shown in FIGURE 11 in connection with the bottom head 48) and the wires within the top chime of the top hoop-and-liner pulled tightly and twisted together so as to maintian such top in place.

In FIGURE 14 the charger mechanism *55a* itself is provided with clamps 57 for engaging the upper edge of a paper hogshead 30. The various charger mechanisms employed may be similar to that shown in the patents to H. G. Bell et al. 2,766,782; 2,734,450 and 2,712,407. In the arrangement of FIGURE 14 it will be understood that there is additional mechanism which reciprocates within the charger shell *55a* and which serves to both introduce the tobacco into the hogshead 30 and thereafter compact same as desired.

The aforementioned steps in the prizing of a hogshead of this invention with tobacco are shown in FIGURES 16, 17 and 18 wherein FIGURE 16 shows a tobacco hogshead 30 immediately after the prizing operation with the charger removed and the corset removed. FIGURE 17 illustrates the fact that the top is loose enough to permit the tobacco hogshead top 61 to be placed within the hogshead 30 on top of the prized tobacco. And in FIGURE 18 the hogshead is shown with the top 61 having been put in place, the wire 47 tightened and the additional wires or straps 62 placed about intermediate portions of the hogshead in order to give it further support. It is also possible that various of the arrangements taught in the said co-pending application for securing the mating edges of the hogshead body might be employed. As perhaps best seen in FIGURE 10, however, such additional support means for the mating edges of the hogshead might not be needed in the case of the paperboard hogshead of this invention wherein the upper and lower ends of the flap 35 are engaged within the notches 36.

Referring now to FIGURES 20–30 we therein illustrate that embodiment of our invention in which the paperboard hogshead takes the form of a four-sided box having also a top and bottom as will be described. Although we have shown this particular embodiment as being rectangular in cross-section it will be apparent to those skilled in the art that boxes having other shapes may be constructed if desired although we have found the four-sided box preferable for shipping and packing reasons. In general the box type hogshead is formed of a paperboard blank suitably scored across its width to define the box sides rather than the individual staves as in the case of the barrel type hogshead. Also included are the metal hoops-and-liners which correspond closely to those of the hogshead first described. Wire lacing is again employed although this is located a little differently than in the case of the barrel type hogshead.

The basic parts of the box type hogshead are shown in FIGURES 20–24 wherein the blank is generally indicated at 70 and having a series of score lines 71 across its width. The blank is also scored longitudinally at two lines along each edge thereof so that the blank may be folded to provide the reinforcing folds 72 and 73 as perhaps best seen in FIGURE 23.

There is a hoop-and-liner for each longitudinal edge of the blank 70, such hoops-and-liners being identical with one another and corresponding generally to those indicated at 40 in connection with the barrel-type hogshead earlier described. Because there are specific differences, however, the hoop-and-liner employed with the blank 70 will be described with application of new reference numerals. Thus we find that such a hoop-and-liner 74 comprises a substantially uninterrupted outer flat band 75, an outer edge protecting portion 76 bent at right angles to the band 75, a portion 77 slanting downwardly from the member 76, another portion 78 bent from the member 77 at substantially right angles towards the band 75, and another band 79 bent downwardly from the member 78 and parallel to the band 75, the distances between the bands 75 and 79 being just sufficient nicely to receive the blank 70 and its folds 72 and 73. As in the case of the hoop-and-liner 40 the hoop-and-liner 74 is also made of metal.

There are a series of holes 80 which pass through the hoop-and-liner portions 75 and 77, which holes align with holes 81 in the paperboard blank 70 and its folds 72 and 73. A series of staples 82 maintain the blank 70 and its folds 72 and 73 in proper position. Another series of staples maintains the hoop-and-liner 74 in proper position along the edges of the blank 70, each such staple passing through the hoop-and-liner band portion 75, the blank 70 and its folds 72 and 73, and the other hoop-and-liner liner 79, all as indicated at 83.

The staples 83 are so positioned that the hogshead top or bottom 84–85 as the case may be will just fit between such staples and the hoop-and-liner portion 78 as will be readily apparent from an examination of FIGURE 30.

Each of the hoops-and-liners 74 is cut away in the region of the portions 77 as indicated at **74*a* so that the blank 70, with the hoops-and-liners 74 affixed thereto, may be bent along the score lines 71** in order to bring it to the position generally indicated in FIGURE 24.

We have found it preferable to locate the score lines 71 of the blank 70 in such manner that when the box type hogshead is assembled the juncture of the mating ends of the blank will be approximately in the middle of one of the side walls as clearly indicated in FIGURES 20 and 24. In order to further strengthen the hogshead we provide the blank 70 with the tab **70*a* and the notches 70*b*. It will be apparent from FIGURE 24 that this arrangement permits the tab 70*a* to be received within the hoop-and-liner members which embrace the notches 70*b***.

The aligned holes 80 and 81 are for the purpose of receiving wire lacing 86 by means of which the box-type hogshead may be securely fastened about the wooden tops and bottoms 84, 85 employed therewith.

Referring now to FIGURES 25 through 30 we shall describe how a box type hogshead of the condition shown in FIGURE 24 is completed. A bottom 85 is placed on a support block 87. Wire lacing is placed through the holes 80, 81 in the manner shown in FIGURE 25 so that the wire 86 lies adjacent the outer band 75 of the hoop-and-liner 74 through its greatest extent, such wire 86 passing through the holes 80, 81 in the region of the corners of the box. A hogshead comprised of the blank 70, hoops-and-liners 74 and wire 86 is wrapped about the bottom 85 while it rests on the support 87. The wire 86 is then drawn tight and its ends twisted together as indicated at 88. The box-type hogshead is then inverted to bring it to the position of FIGURE 27 wherein it is ready to be prized with tobacco. In this connection it will be understood that the various prizing and charging apparatus described earlier will be here employed with the exception that certain of the elements will be made rectangular in cross-section so as to accommodate the box-type hogshead as distinguished from the barrel-type hogshead. The manner of prizing the tobacco within the box-type hogshead of FIGURE 27 is otherwise the same.

After the box-type hogshead has been prized with tobacco a top 84 is then put in place and the top wire 86 pulled and tightened as indicated at 88 to complete the arrangement as seen in FIGURES 28 and 30.

It is believed that this invention has been made clear by the detailed description herein above presented. A further description of this operation is not believed necessary.

It is to be understood that while this invention has been disclosed as embodied in certain particular structures and arrangements, these do not form a specific part of the invention except insofar as they are set forth in the subjoined claims.

It will also be understood and apparent to those skilled in the art that modifications may be made without departing from its scope and spirit.

Having thus described this invention, what is claimed as new and what is desired to be protected by United States Letters Patent is:

1. A paperboard hogshead comprising a paperboard blank having transverse score lines defining the side walls of said hogshead, said blank having a pair of second score lines disposed parallel to and adjacent each longitudinal edge of said blank whereby said blank is folded to present a longitudinal edge comprised of three layers of said paperboard; a pair of metal hoops-and-liners, one to engage each longitudinal edge of said blank, each said hoop-and-liner comprising an outer band in face to face contact with one of said three layers, an interrupted inner band in face to face contact with another of said three layers, all of said three layers being disposed between said bands, an intermediate portion abutting the extreme folded edge of said blank, and a hollow chime section secured to said interrupted inner band; a top abutting one of said chime sections; a bottom abutting the other of said chime sections; and a pair of wires, one for each said hoop-and-liner, each said wire lying substantially along the hoop-and-liner band exterior of said hogshead, said hoop-and-liner and said blank having aligned holes to permit a said wire to cut across a hogshead corner in passing from one side wall to an adjacent side wall.

2. The hogshead of claim 1 in which there is a pair of chimes for one side wall; said blank, when disposed and held about said top and bottom by said wires, having the ends thereof meet substantially centrally of said one side wall; and a single chime for each of the other side walls, each said single chime extending substantially across its said wall.

References Cited by the Examiner

UNITED STATES PATENTS

| | | | |
|---|---|---|---|
| Re. 10,827 | 4/1887 | Lockwood | 141—80 |
| 988,562 | 4/1911 | Fleming | 217—12 |
| 1,189,204 | 6/1916 | Kuentzel | 217—12 |
| 1,288,598 | 12/1918 | Inwood | 217—12 |
| 1,793,101 | 2/1931 | Labombarde | 229—23 X |
| 1,988,323 | 1/1935 | Mackenzie | 217—12 |
| 2,178,778 | 11/1939 | Curry | 229—5.7 X |
| 2,226,178 | 12/1940 | Page | 229—5.5 |
| 2,241,210 | 5/1941 | Luckett | 217—44 |
| 2,505,453 | 4/1950 | Wolff | 141—80 |
| 2,555,530 | 6/1951 | Bell et al. | |
| 2,603,401 | 7/1952 | Strauss | 229—5.5 |

GEORGE O. RALSTON, *Primary Examiner.*

LAVERNE D. GEIGER, *Examiner.*